Dec. 1, 1931.   L. D. SOUBIER   1,834,433
MACHINE FOR FORMING GLASSWARE
Filed Nov. 14, 1927   8 Sheets-Sheet 1

INVENTOR
Leonard D. Soubier
BY
J. F. Rule,
HIS ATTORNEY

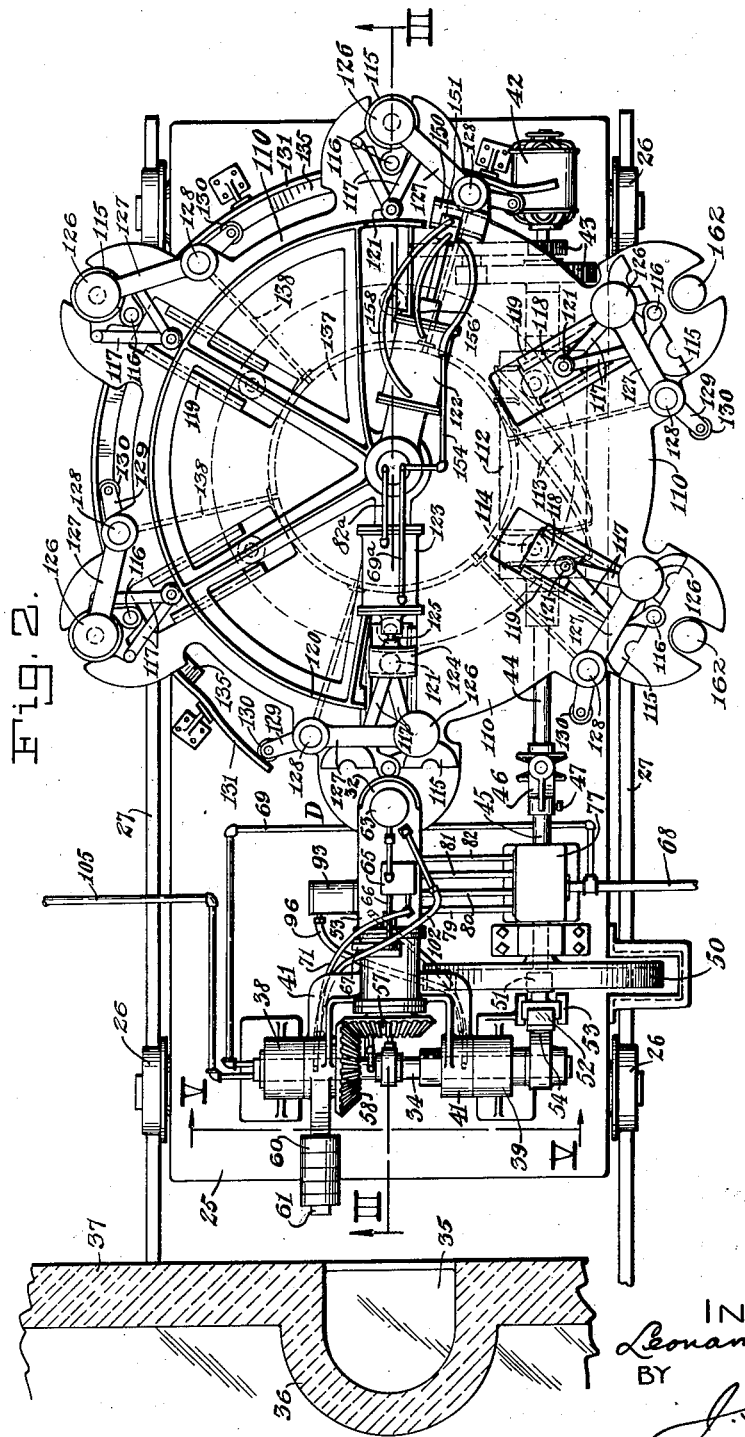

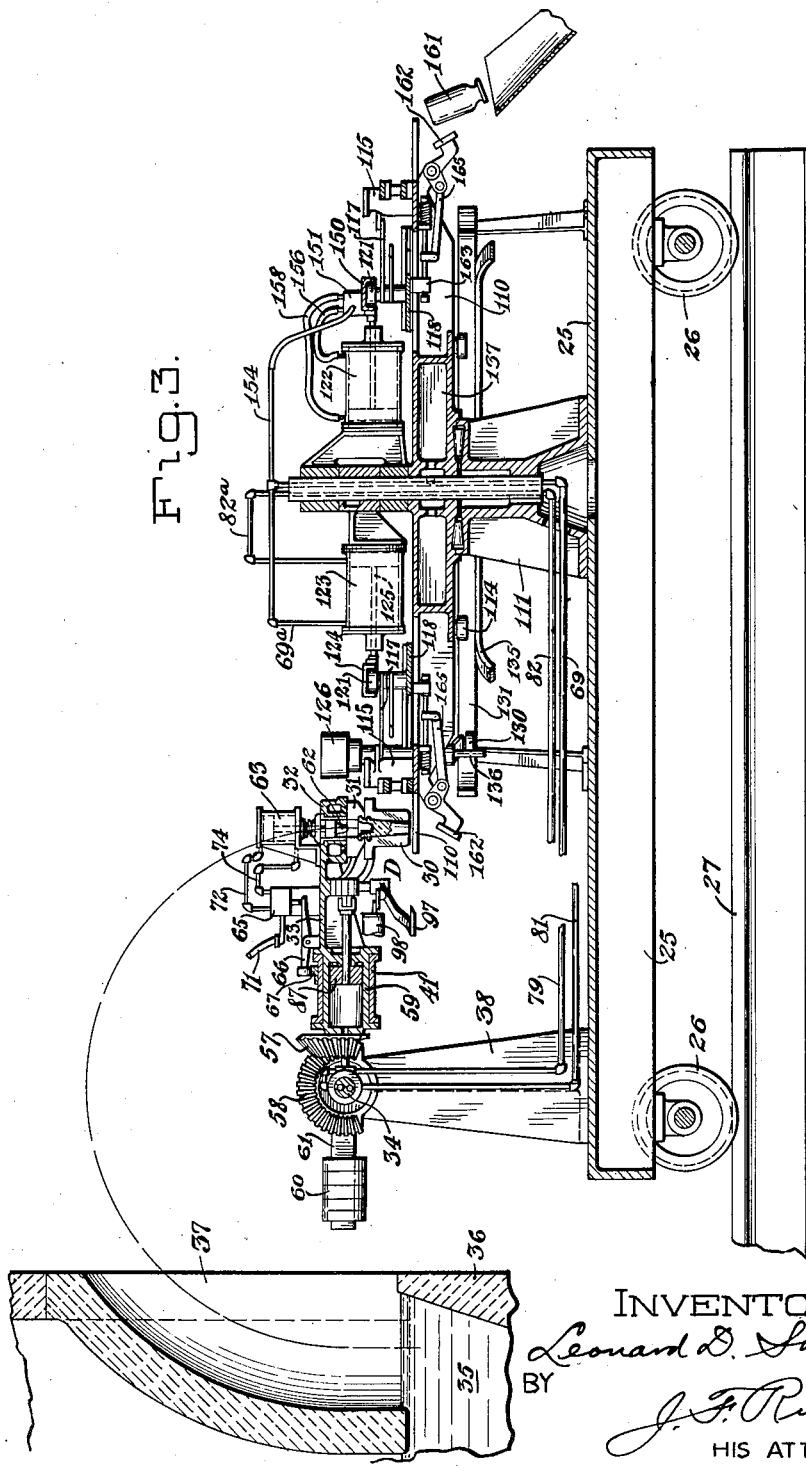

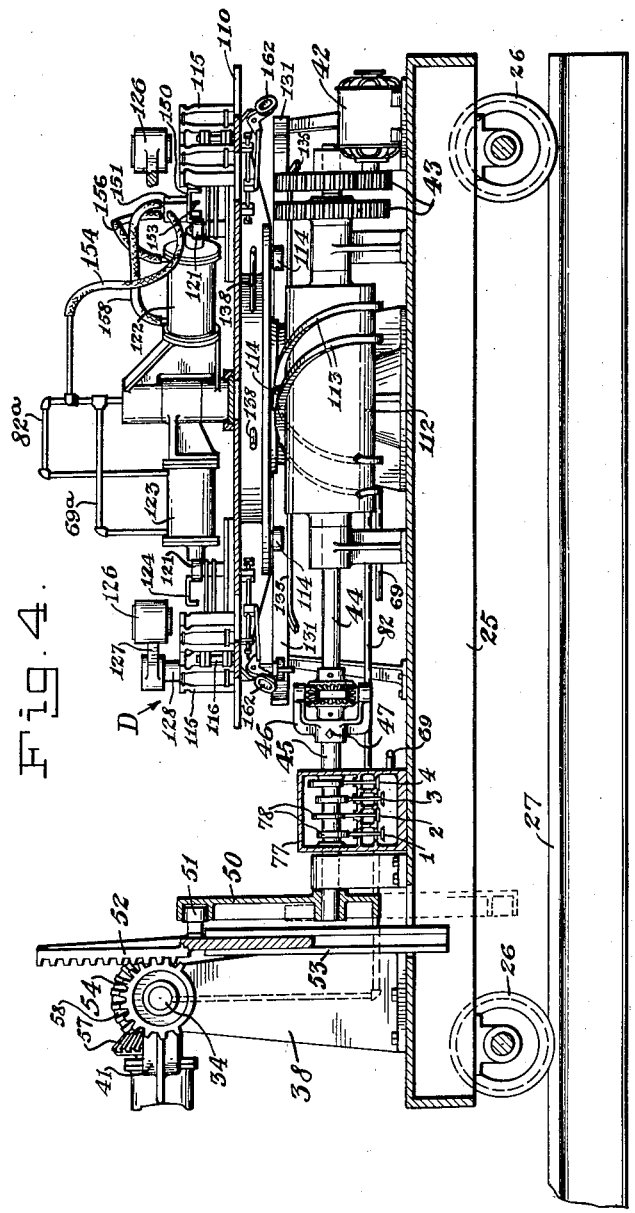

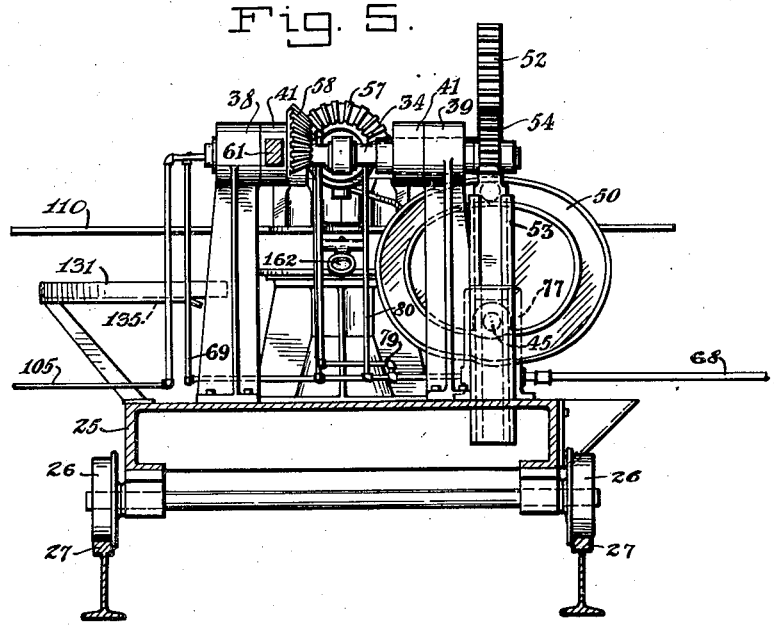
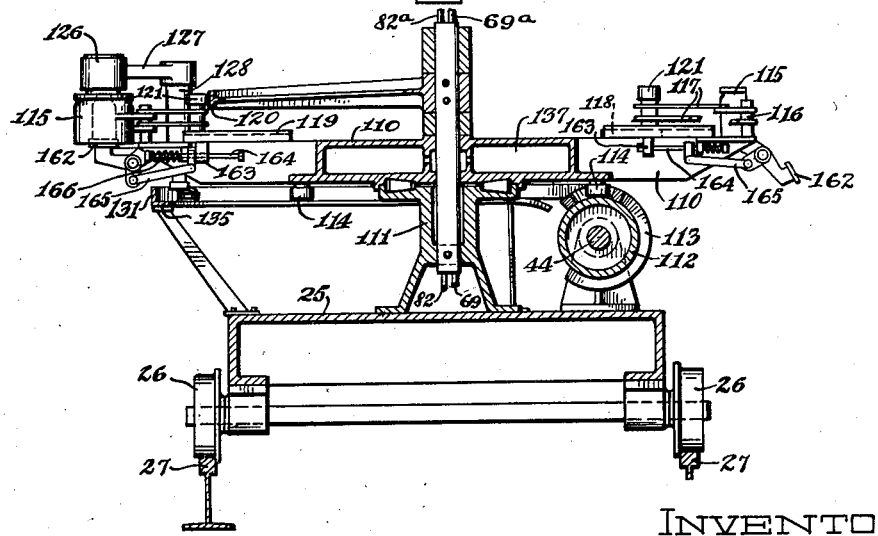

Dec. 1, 1931.  L. D. SOUBIER  1,834,433
MACHINE FOR FORMING GLASSWARE
Filed Nov. 14, 1927   8 Sheets-Sheet 6
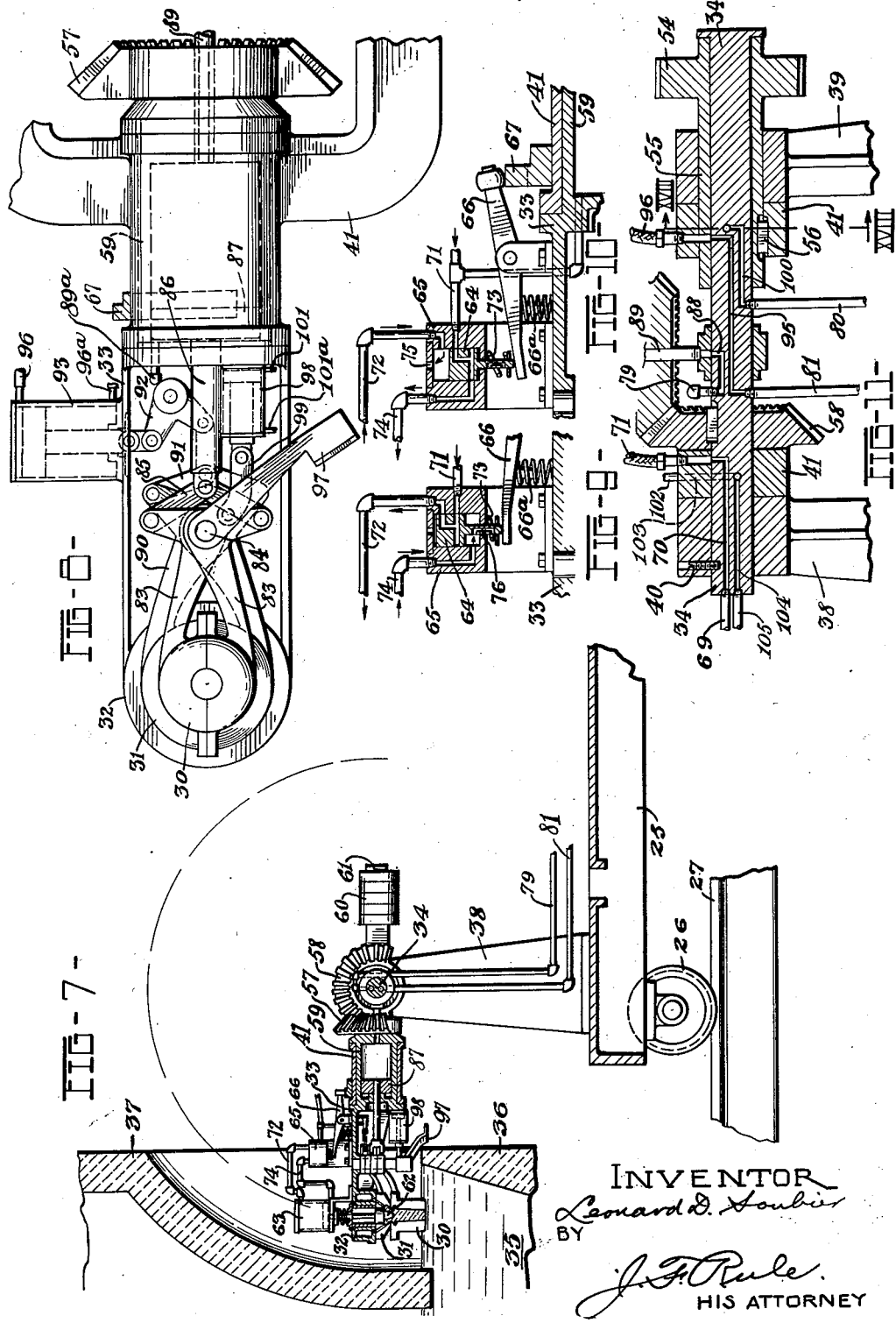
INVENTOR
Leonard D. Soubier
BY
J. F. Rule.
HIS ATTORNEY Dec. 1, 1931.  L. D. SOUBIER  1,834,433
MACHINE FOR FORMING GLASSWARE
Filed Nov. 14, 1927  8 Sheets-Sheet 7
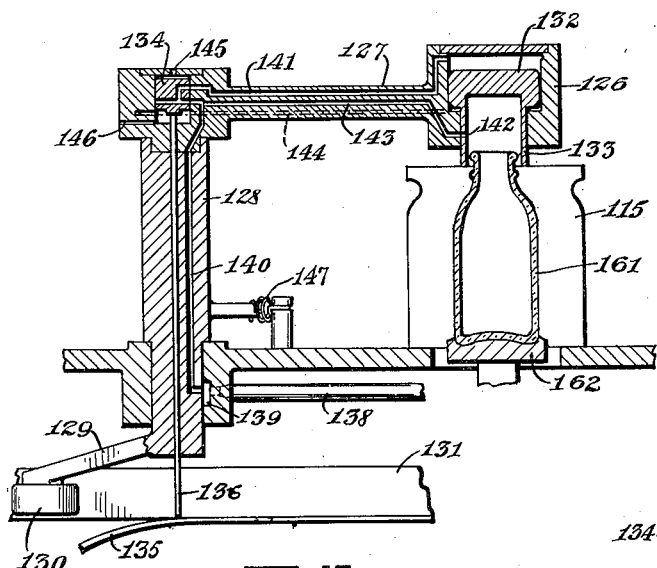
FIG-12-
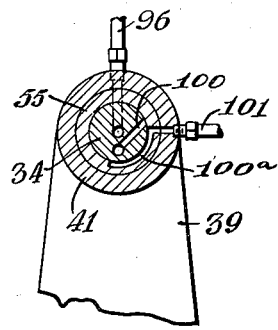
FIG-18-
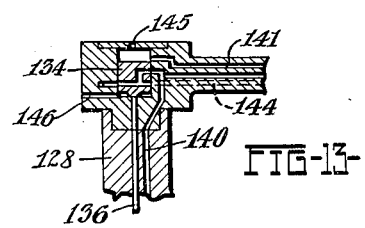
FIG-13-
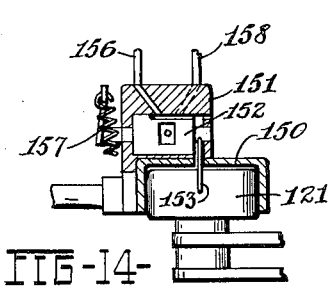
FIG-14-
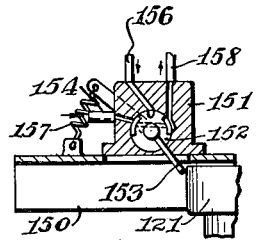
FIG-15-
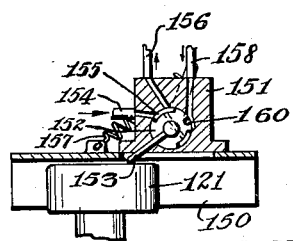
FIG-16-
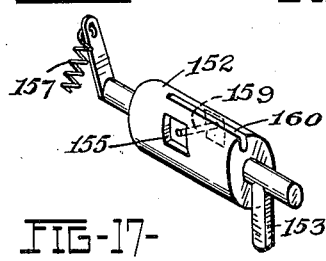
FIG-17-
Inventor
Leonard D. Soubier
By J. F. Rule.
Attorney Dec. 1, 1931.    L. D. SOUBIER    1,834,433
MACHINE FOR FORMING GLASSWARE
Filed Nov. 14, 1927    8 Sheets-Sheet 8
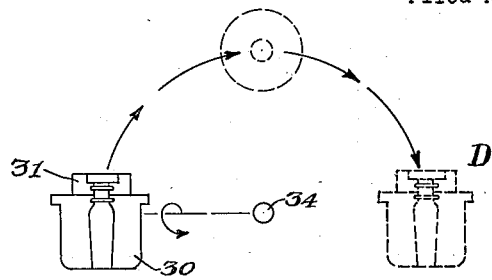
FIG-19-
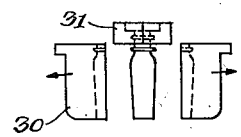
FIG-20-
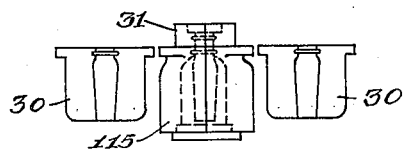
FIG-21-
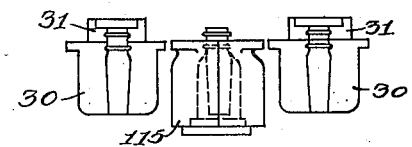
FIG-22-
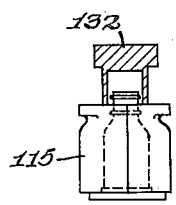
FIG-23-
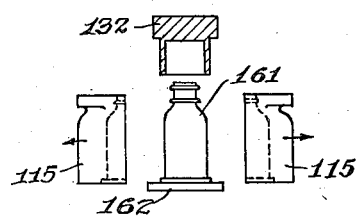
FIG-24-
Inventor
Leonard D. Soubier,
By
J. F. Rule.
Attorney Patented Dec. 1, 1931

1,834,433

UNITED STATES PATENT OFFICE

LEONARD D. SOUBIER, OF TOLEDO, OHIO, ASSIGNOR TO OWENS-ILLINOIS GLASS COMPANY, OF TOLEDO, OHIO, A CORPORATION OF OHIO

MACHINE FOR FORMING GLASSWARE

Application filed November 14, 1927. Serial No. 233,050.

My invention relates to machines for forming hollow glass articles and particularly to machines in which the charges of glass for forming the articles are drawn by suction into blank molds, formed into parisons and transferred to finishing molds in which the parisons are blown to their final shape.

In accordance with present day practice it is customary to provide, in machines of the type indicated, a plurality of blank molds and an equal number of finishing molds, a blank mold being associated with each finishing mold. After a parison is blown in a finishing mold it is retained therein long enough to cool sufficiently to retain its shape after the finishing mold is withdrawn. It is thus necessary to retain the glass in the finishing mold for a considerably longer time than that required to gather the charge in the blank mold and deliver it to the finishing mold. As a result, the blank molds are idle a large proportion of the time.

An object of the present invention is to provide a machine of the character indicated in which the blank mold or each blank mold, if more than one is employed, operates to form and deliver parisons to a plurality of finishing molds, whereby the blank mold is utilized to its full capacity. In this manner, a comparatively large output is obtained from a machine having a given number of molds.

A further object of the invention is to provide a machine of simple and practical construction which is comparatively inexpensive to build and operate and which is much smaller and comprises fewer parts than machines now in general use having equal capacity.

A further object of the invention is to provide an improved form of suction gathering machine designed to gather charges directly from the main furnace tank or a forehearth extension thereof, thereby eliminating the revolving gathering pot now in general use with suction gathering machines.

Other objects of the invention will appear hereinafter.

In the accompanying drawings:

Fig. 2 is a view similar to Fig. 1, but with the blank mold swung to a position for transferring the parison to a finishing mold.

Fig. 3 is a sectional elevation of the machine at the plane of the line III—III on Fig. 2.

Fig. 4 is a sectional elevation at the plane of the line IV—IV on Fig. 1.

Fig. 5 is a section at the line V—V on Fig. 2.

Fig. 6 is a section at the line VI—VI on Fig. 1.

Fig. 7 is a section at the line VII—VII on Fig. 1.

Fig. 8 is a bottom plan view on an enlarged scale, of the blank mold and transfer arm.

Figs. 9 and 10 are sectional detail views of the valve mechanism controlling the air motor for operating the plunger. Fig. 9 shows the valve in position for effecting a lowering of the plunger, and Fig. 10 shows the valve in position for causing the plunger to be lifted.

Fig. 11 is a fragmentary sectional view showing the shaft on which the transfer arm oscillates.

Fig. 12 is a fragmentary sectional view showing a finishing mold and its blow head, and the valve for controlling the blow head.

Fig. 13 is a fragmentary view showing the blow head valve in a different position.

Figure 1:
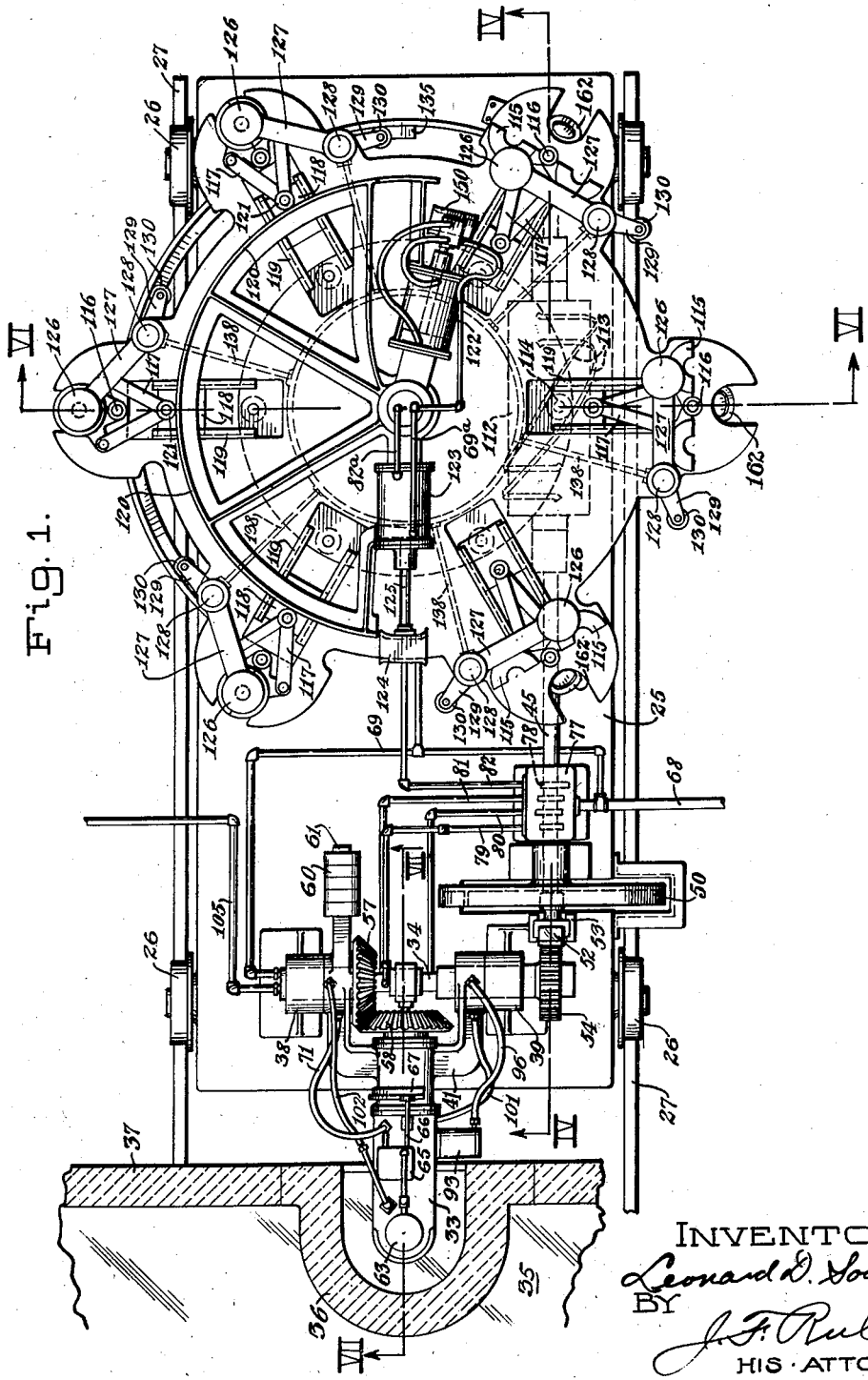
Fig. 1 is a plan view of a machine embodying the principles of my invention, the blank mold being in charge gathering position.

Figs. 14, 15 and 16 are fragmentary views showing a valve controlling an air motor for opening the finishing molds. Fig. 14 is a section taken at a plane radial to the mold carriage. Fig. 15 is a section taken at right angles to the plane of Fig. 14, showing the valve before it is positioned to cause the motor to open the mold. Fig. 16 is a view similar to Fig. 15, showing the position of parts after the valve has been actuated to effect an opening of the mold.

Fig. 17 is a perspective view of the valve shown in Figs. 14 to 16.

Fig. 18 is a section at the line XVIII—XVIII on Fig. 11.

Figs. 19 to 24, inclusive, are diagrammatic views showing successive steps in the operation of the molds.

Fig. 19 illustrates in full lines a blank mold and neck mold in gathering position, and in broken lines shows them in position to deliver a parison to the finishing mold.

Fig. 20 indicates the opening movement of the blank mold, leaving the bare parison suspended from the neck mold.

Fig. 21 shows the blank mold in fully opened position, and the finishing mold closed around the parison.

Fig. 22 shows the neck mold in open position, leaving the parison enclosed in the finishing mold, but with the neck of the parison exposed.

Fig. 23 shows the blow head seated on the finishing mold for blowing the parison.

Fig. 24 indicates withdrawal of the blow head and opening of the finishing mold, leaving the finished article free to be discharged from the machine.

General construction

The machine, as herein illustrated, may be considered as comprising two main parts, namely, first, the blank forming and transfer mechanism which includes the suction gathering blank mold, the transfer arm by which the blank mold is swung from a charge gathering position to a position for delivering the parison to a finishing mold, and mechanism for actuating the blank mold and transfer arm; and, second, the finishing mold carriage with the finishing molds and associated mechanisms mounted thereon. The operating parts are mounted on a platform or truck 25 carried on wheels 26 which run on rails 27, permitting the machine to be moved to and from the furnace.

Blank transfer mechanism

The blank forming and transfer mechanism which will now be described, comprises a gathering head or unit (see Figs. 7 and 8) including a blank mold 30, a neck mold or ring 31 and a suction gathering head 32, said parts being carried on a horizontally disposed transfer arm 33 mounted to swing in a vertical plane about a stationary horizontal shaft 34 from the gathering position (Figs. 1 and 7) to the delivery position (Figs. 2 and 3). The movement of the gathering head into gathering position causes the blank mold to dip into a supply body of molten glass 35 in the forehearth or boot 36 of the tank 37, and a charge of glass is drawn by suction into the mold in the manner hereinafter explained.

The shaft 34 (see Figs. 7 and 11) is mounted in standards 38 and 39 and is held against rotation by a set screw 40. The transfer arm 33 is swivelled in a yoke 41 (Figs. 1, 8 and 11) for rotation about its longitudinal axis, and the yoke is mounted to swing on the shaft 34. Means for actuating the transfer arm includes an electric motor 42 (Figs. 2 and 4) operating through a train of speed reduction gearing 43 to drive a horizontal shaft comprising sections 44 and 45. These shaft sections are connected by an adjusting device comprising a yoke 46 mounted on the shaft section 45 and carrying bevel pinions meshing with gears on the adjacent ends of the shaft sections. The yoke 46 is locked to the shaft section 45 by a set screw 47. By loosening the set screw, rotation of the yoke on its shaft is permitted for effecting a differential rotative adjustment of the shaft section 45 relative to the section 44 for a purpose hereinafter pointed out.

A cam 50 (see Figs. 1, 4 and 5) keyed to the shaft 45, is formed on its outer face with a cam track on which runs a roll 51 carried by a rack bar 52 which is mounted to reciprocate vertically in a stationary vertical guide 53. The rack bar 52 is formed with rack teeth meshing with a pinion 54 rotatively mounted on the stationary shaft 34. By reference to Fig. 11, it will be seen that the hub of the pinion 54 is lengthened to form a bearing sleeve 55 journalled in the standard 39. A key 56 locks the yoke 41 to said sleeve 55 so that rotative movement of the pinion 54 is imparted to the transfer arm 33 and swings it about the shaft 34. It will be noted that as the shaft 45 rotates, the cam 50 will be carried from the full line position, Fig. 4, to the dotted line position, thereby lowering the rack bar 52 and swinging the transfer arm 33 from the gathering position (Fig. 7) to the discharge position (Fig. 3), the transfer arm during this movement swinging in a vertical plane through an arc of about 180 degrees.

During this transfer movement, the arm 33 with the gathering head or unit 30, 31, 32, is rotated about its longitudinal axis in order to present the parison in upright position to the finishing mold. This rotation of the arm 33 about its axis is effected by means of a bevel pinion 57 fixed to said arm and running in mesh with a stationary bevel pinion 58 keyed to the shaft 34. The portion of the transfer arm 33 adjacent the gear 57 is in the form of a hollow cylinder 59 which provides a bearing for the yoke 41 and also functions as the cylinder of an air motor for opening and closing the blank mold, as hereinafter set forth. The weight of the gathering head is counterbalanced by an adjustable counterweight 60 (Fig. 2) comprising weights removably mounted on an arm 61 forming an extension of the yoke 41.

Plunger operation

When the blank mold is in gathering position (Fig. 7) the neck mold 31 is directly over and in register therewith. As the gathering head moves downward to gathering position, a plunger 62 is projected downward through the neck mold into position to form an initial blow opening in the blank of glass. This plunger is actuated by an air motor 63 controlled by the valve mechanism shown in Figs. 9 and 10. This mechanism comprises a valve 64 movable up and down in a valve box 65 mounted on the transfer arm 33. The position of the valve is controlled by a lever 66 mounted on the arm 33. The lever is moved in one direction by a spring 66ª and in the other direction by a cam 67 (Figs. 8 and 10) fixed to the non-rotating yoke 41. As the mold moves downward to gathering position, the spring 66ª operates the lever 66 to lift the valve to the Fig. 9 position. In this position of the valve, air under pressure is supplied to the air motor 63 for lowering the plunger. The air is supplied through an air line which may be traced from the air pressure pipe 68 (Fig. 1) which is connected to a constant source of air under pressure, through pipe line 69 (Figs. 1 and 11), conduit 70 (Fig. 11) extending through the shaft 34 and yoke 41, flexible hose 71 (Figs. 11, 1 and 9), through valve 64 and pipe 72 to the upper end of the cylinder 63.

The glass is drawn into the blank mold and neck mold by suction applied through the suction gathering head 32 (Fig. 7). The air is exhausted from said head through a pipe 102 (Figs. 1 and 11) leading to a port 103 in the yoke bearing 41. This port registers with a channel 104 in the shaft 34 when the blank mold is in gathering position. A vacuum pipe 105 leads from the channel 104 to a source of vacuum.

When the transfer arm 33 swings upward after the mold has received its charge, the concurrent rotation of said arm about its own axis causes the lever 66 (Fig. 10) to run onto a high portion of the cam 67, thereby withdrawing said lever from the valve 64 and permitting a coil spring 73 to move the valve to the Fig. 10 position. This connects the air pressure pipe 71 through the valve to a pipe 74 leading to the lower end of the air motor 63 so that the latter is operated to withdraw the plunger. During this movement the air above the motor piston is exhausted through the pipe 72 and an exhaust port 75 (Fig. 10). In like manner, the air below the piston is exhausted during the down stroke, through the pipe 74 and an exhaust port 76 in the valve stem.

The air pressure pipe 68 leads to a valve box 77 (Figs. 1, 2 and 4) in which are valves 1, 2, 3 and 4 actuated by a series of cams 78 individual to the valves, said cams being mounted on the shaft 45. The valves 1, 2, 3 and 4 control the supply of air to pipes 79, 80, 81 and 82, respectively, for supplying air to air motors, as hereinafter pointed out.

The blank mold 30 (see Figs. 7 and 8) comprises partible sections carried by arms 83 mounted on a pivot 84 carried by the transfer arm 33. Links 85 connect said mold arms with a piston rod 86 connected to the piston 87 of the air motor 59.

The supply of air for operating the motor 59 to close the blank mold, is controlled by the valve 1 (Fig. 4) which admits air to the air line comprising pipe 79 (Figs. 1, 7, 11), conduit 88 extending through shaft 34, and pipe 89 (Figs. 11 and 8) extending to the air motor cylinder 59. When the air pressure supply through the pipe 89 is cut off, the piston 87 is returned by air pressure admitted to the front of the cylinder 59 through a pipe 89ª (Fig. 8) leading to a continuous source of air pressure.

The neck mold 31 (see Fig. 8) comprises separable sections carried by arms 90 pivoted on the shaft 84, said arms being operatively connected through links 91 and a bell crank lever 92 to the piston rod of an air operated piston motor 93 mounted on the transfer arm 33. The supply of air for operating the motor 93 to open the neck mold is controlled by the valve 3 (Fig. 4) which admits air to pipe 81 (Figs. 1 and 11), conduit 95 extending through the shaft 34, pipe 96 (Figs. 11 and 1) extending to the outer end of the air motor 93. A pipe 96ª (Fig. 8) connects the inner end of the motor 93 with constant air pressure for moving the piston outward and closing the neck mold when the air supply through pipe 96 is cut off.

A knife 97 is provided for severing the glass at the lower end of the blank mold after the latter has gathered its charge and been lifted from the supply body of glass in the tank. The knife arm is pivoted to the shaft 84 and is actuated by an air motor 98, the piston rod of which is connected through a link 99 to the knife arm. Air for operating the motor 98 is controlled by the valve 2, the air line extending through pipe 80 (Figs. 1 and 11) to a conduit 100 extending through the shaft 34 (Figs. 11 and 18). As indicated in Fig. 18, the conduit 100 is closed by the sleeve 55 while the mold is in dip. As the mold lifts and the arm 33 commences to rotate about its own axis, the conduit 100 is brought into register with a port 100ª in the sleeve 55 and establishes communication with a pipe 101 (Figs. 18, 1 and 8) leading to the motor 98. Air is, therefore, supplied to operate the knife and sever the glass as soon as the mold is lifted above the level of the glass in the tank. The knife is withdrawn to the Fig. 8 position by air pressure supplied to the front end of the motor cylinder through a pipe 101ª connected to constant source of air pressure.

*Mold carriage rotation*

The mold carriage 110 is mounted for intermittent rotation on a standard 111 rising from the platform 25. This intermittent rotation is imparted to the mold carriage by means of a continuously rotating cam drum 112 fixed to the shaft 44, said drum having on its face spirally arranged ribs 113 providing a cam track in which run rolls 114 on the lower face of the mold carriage 110. By reference to Fig. 2, it will be seen that the distance between each two adjacent rolls 114 is equal to the distance between the two end portions of the cam track, the arrangement of the latter being such that when one roll 114 leaves the track the next one is in engagement therewith. It will also be noted that the end portions of the cam track extend in planes substantially perpendicular to the axis of the cam drum so that during a substantial portion of the rotation of said drum there is no movement of the cam rolls lengthwise of the drum. There is thus an intermittent or step-by-step rotation of the mold carriage, whereby the latter is brought to rest each time a finishing mold is brought to position for receiving a parison from the blank mold.

Finishing mold closing operation

Each finishing mold 115 is made in sections mounted to swing about a pivot pin 116 to which are pivotally connected a pair of links 117, the opposite ends of which are pivoted to a slide block 118 mounted to reciprocate radially of the mold carriage in guides 119 on the carriage. Each finishing mold is held in closed position during a certain portion of the rotation of the mold carriage, by means of a stationary cam track 120 on which runs a cam roll 121 carried on the slide block 118. The finishing molds are opened and closed by means of air motors 122 and 123 respectively. Each finishing mold is operatively connected to the motor 123 when the open mold is brought to the Fig. 2 position preparatory to closing about the parison. This connection is effected by means of a connecting head 124 carried by the piston rod 125 of the motor 123. Said head is U-shaped in cross-section, providing a guideway or channel into which runs the cam roll 121 as the finishing mold is brought to rest at the parison receiving position (Fig. 2). The motor 123 then operates to move the head 124 radially outward from the position shown in Fig. 2 to that shown in Fig. 1. This operation of the motor closes the mold about the parison and brings the cam roll 121 to such position that when the mold carriage is again rotated, the cam roll 121 engages the track 120.

The supply of air for operating the motor 123 for closing the finishing molds is controlled by the valve 4 (Fig. 4) which admits air to the pipe 82 (Figs. 1 and 3). This air line is continued through the vertical shaft of the mold carriage and thence through pipe 82ᵃ leading to the inner end of the motor cylinder. When this air supply is cut off, the motor 123 is operated to draw the head 124 inwardly by means of air pressure continuously supplied through a pipe 69ᵃ leading to the front end of the motor cylinder. This pipe is in communication with the constant pressure air pipe 69 through an air channel extending through the shaft of the mold carriage.

Blowing the parison

After the finishing mold has closed about the parison at the transfer station and the neck mold has opened, leaving the parison supported solely by the finishing mold, with the neck of the parison protruding above the mold, a blowing head 126 (see Figs. 2 and 12) is brought into operation. This head is carried by a horizontal arm 127 fixed to the upper end of a vertical rock shaft 128 which is journalled adjacent its lower end in the mold carriage. Extending from the lower end of the rock shaft 128 is a rock arm 129 which carries a cam engaging roll 130 which runs on a stationary cam track 131. This cam track is so shaped that as the finishing mold travels from its charge receiving station to the next succeeding station, the blowing head 126 is swung outward to a position directly over the finishing mold. The blowing head (Fig. 12) comprises a piston head or valve 132 movable vertically in its casing and formed with a tubular extension 133 adapted to seat on the upper face of the finishing mold 115. A valve 134 (Figs. 12 and 13) is mounted for vertical movement in the upper end of the rock shaft 128 and controls the up and down movements of the head 132. The valve 134 is actuated by a stationary cam 135 which operates through a rod 136 attached to the valve and extending downward through the shaft 128. The relative arrangement of the cams 131 and 135 is such that as the carriage rotates, the blowing head is first swung laterally to a position over the mold and the valve 134 is then lifted by its cam to the Fig. 12 position, in which air is admitted above the head 132 to lower it onto the mold and permit the parison to be blown to its finished form in the mold.

The air for blowing the parisons is distributed to the blow heads from a distributing head or drum 137 formed in the mold carriage. The air is conveyed from this drum through radial pipes 138 (see Figs. 2 and 12) which pipes terminate at ports 139 in the bearings for the rock shafts 128. From the port 139 an air channel 140 leads upward through the shaft 128. When the valve 134 is in its lifted position (Fig. 12) it establishes communication between the channel 140 and a channel 141 leading through the arm 127 to the blowing head casing above the head 132. Air under pressure is thus supplied to lower the blowing head. When said head is lowered, a port 142 is brought into line with a passageway 143 which communicates with the channel 140 so that air under pressure is admitted for blowing the parison in the finishing mold.

After the blowing operation has been continued a sufficient length of time, determined by the length of the cam 135, the rod 136 is disengaged from said cam permitting the valve 134 to drop to the Fig. 13 position. The air channel 141 is thus cut off from the supply of air under pressure. At the same time, the conduit 140 is connected through the valve to a conduit 144 leading through the arm 127 and opening into the blowing head casing below the head 132 so that air under pressure is admitted to lift the blowing head. At the same time, the air in the casing above said head is permitted to escape through the channel 141 which is now open to an exhaust port 145. An exhaust port 146 communicates with the channel 144 when the valve 134 is in its lifted position to permit escape of air from beneath the head 132 as the latter is lowered. When the cam roll 130 (Fig. 12) passes beyond the cam 131, the shaft 128 is rocked by means of a spring 147 to swing the blow head to its inoperative position.

Opening finishing mold

The operation of the motor 122 (see Figs. 1, 2 and 3) for opening the finishing molds will now be described. As a finishing mold passes beyond the track 120, the roll 121 carried thereby engages a head 150 on the motor piston, which head is at this time in the Fig. 2 position in line with the track 120. Referring particularly to Figs. 14, 15 and 16, it will be seen that the head 150 which is of channel formation, has mounted thereon a valve box 151 in which is mounted for oscillation a cylindrical valve 152 (see also Fig. 17). A finger 153 carried by the valve projects downward through a slot in the head 150, into the path of the rolls 121 so that when one of said rolls enters said head it swings the valve from the Fig. 15 position to the Fig. 16 position. Air connections are thereby established for actuating the motor 122 so that its piston is moved radially inward and operates through its connections with the roll 121 to open the corresponding finishing mold. The air connections comprise a pipe 154 (see Fig. 3) forming part of an air line including the pipe 69. With the valve 152 in the Fig. 16 position, the air pressure is connected through a port 155 to a pipe 156 leading to the outer end of the motor cylinder so that air pressure is admitted for moving the head 150 inwardly and opening the finishing mold. As shown in Fig. 2, the motor 122 is so positioned that the operation thereof for opening the mold takes place while the mold carriage is in one of its rest positions. After the motor 122 has thus operated and the mold carriage is again rotated, the roll 121 passes beyond the finger 153 and the valve 152 is swung back to the Fig. 15 position by means of a coil spring 157. This establishes communication between the pressure pipe 154 and a pipe 158 through an opening 159 extending through the valve. The pipe 158 leads to the inner end of the motor 122 so that air pressure is admitted behind the piston and moves the latter outward, thereby returning the head 150 to the Fig. 2 position ready to make connection with the next succeeding finishing mold. During this outward movement of the motor piston, the air in front of the piston is exhausted through the pipe 156 which at this time is in register with an open slot 160 in the valve. It will also be noted that with the valve in the Fig. 16 position, the slot 160 is open to the pipe 158 to permit escape of the air from the inner end of the motor cylinder as the piston moves inward.

Tilting mold bottom

When a finishing mold opens, the bottle 161 is discharged from the machine (see Fig. 3) by tilting the mold bottom 162 downward. The mold bottom has an operating connection with the slide block 118. This connection comprises a lug 163 (Fig. 6) extending downward from said block and in which is slidably mounted, a forwardly extending rod 164. Said rod has a link connection 165 with the mold bottom arm. As the slide block 118 moves inward to open the mold, the mold bottom is swung down by means of the connections just described. As the finishing mold returns to its closed position, the mold bottom is lifted by means of a coil spring 166 mounted on the rod 164. (It will be noted that the rod 164 is slidable in the lug 163, as will be apparent by a comparison of these parts as shown at opposite sides of the mold carriage on Fig. 6.) The lost motion connection between the rod 164 and block 118 permits the mold bottom to be held up by the spring 166 until the mold has opened sufficiently to permit discharge of the bottle without striking the edges of the mold. It also permits the mold bottom to be lifted well in advance of the closing of the mold sections.

Figs. 19 to 24 illustrate diagrammatically the successive steps in the formation of the bottle. As shown in full lines in Fig. 19, the blank mold 30 and neck mold 31 are in register and the blank mold in dip. When the charge of glass has been gathered, the transfer arm swings the combined blank mold and neck mold about the axis of the shaft 34 through 180 degrees to the delivery station D. The blank mold 30 then opens, as indicated in Fig. 20, leaving the parison suspended from the neck mold. The finishing mold 115 then encloses the parison, as shown in Fig. 21, after which the neck mold opens, as shown in Fig. 22, leaving the parison supported in the finishing mold with the neck end exposed. The blowing head 132 is now brought down and seats on the finishing mold (Fig. 23) and the parison is blown to finished form. The blowing head then rises (Fig. 24) and the finishing mold opens, leaving the bottle 161 supported on the mold bottom 162 which tilts during the final opening movement of the mold and discharges the bottle.

*Operation*

The operation of the machine may be summarized as follows: The motor 42 (see Fig. 2) rotates the drive shaft 44 continuously so that the cam drum 112 thereon at each complete rotation of the drive shaft rotates the mold carriage one step, bringing the open finishing molds 115 in succession to the delivery station D. Each complete rotation of the drive shaft also causes the cam 50 thereon to reciprocate the rack 52, thereby oscillating the shaft 34 so that the transfer arm 33 is swung thereby to carry the blank mold 30 from charge gathering position (Fig. 7) through 180 degrees to the delivery station D, where the parison is transferred to the finishing mold and back to gathering position. When the blank mold is in dip (Fig. 7) a charge is gathered by suction applied through the gathering head 32. As the mold lifts out of the glass, the knife 97 is operated by its air motor 98 (Fig. 8) to sever the tail of glass depending from the mold. About the same time, the plunger 62 is withdrawn by its motor 63, the operation of which is controlled by the valve shown in Figs. 9 and 10, the latter being in turn controlled by a cam 67 on the transfer arm 33 which during the transfer movement is rotated about its own axis by means of the gears 57 and 58. When the blank mold with the blank therein has thus been brought to the delivery station D, the blank mold is opened by the air motor (Fig. 8) comprising the piston 87 moving in the cylinder 59, leaving the bare blank suspended from the neck mold 31. The finishing mold 115 at the delivery station is now closed around the blank mold by the operation of the piston motor 123 having temporary operating connection with the blank mold through the head 124. The transfer arm with the blank mold thereon is now swung away from the delivery station and the finishing mold carriage is rotated. As the mold carriage rotates, the blowing head 126 operated by the stationary cam 131, swings over the finishing mold and is lowered onto the mold as shown in Fig. 12. The parison is now blown to finished form. The finishing mold is held closed by the stationary track 120 until the roll 121 associated with said mold has passed beyond said track into engagement with the head 150 on the piston of the motor 122. The latter then operates to open the finishing mold, swing the mold bottom 162 downward and discharge the bottle.

Modifications may be resorted to within the spirit and scope of my invention.

What I claim is:

1. In a machine for forming hollow glass articles, the combination of a mold carriage rotatable about a vertical axis, finishing molds thereon, means for rotating the carriage and bringing the molds in succession to a delivery station, a blank mold, means for introducing charges of glass into the blank mold at a charging station, means for swinging the blank mold back and forth about a horizontal axis between the charging station and delivery station, and means for causing the delivery of parisons from the blank mold to the finishing molds at said delivery station.

2. In a machine for forming hollow glass articles, the combination of a mold carriage rotatable about a vertical axis, finishing molds carried thereby and brought in succession to a delivery station, a transfer arm, a blank mold carried thereby, a neck mold associated with the blank mold, means for oscillating said arm about a horizontal axis and swinging the blank mold back and forth between a charge receiving station and said delivery station, and means for transferring parisons from the blank mold to the finishing molds in succession.

3. In a glass forming machine, the combination of a blank mold, a finishing mold, a transfer arm on which the blank mold is carried, means for swinging said arm about a horizontal axis and thereby carrying the blank mold from a charge receiving position to a delivery station, means for rotating the blank mold about the longitudinal axis of said arm during said swinging movement, and means for transferring the blank at said delivery station to the finishing mold.

4. In a glass forming machine, the combination of a suction gathering mold, a finishing mold, an arm on which the gathering mold is mounted, means for swinging said arm about a horizontal axis and thereby moving the gathering mold from a charge receiving position to a delivery station, means to rotate the gathering mold about the longitudinal axis of said arm through about 180 degrees during said transfer movement, and means for causing the transfer of the glass from the gathering mold to the finishing mold at said delivery station.

5. In a glass forming machine, the combination of a body blank mold comprising partible sections, a neck mold above and in register therewith, means for charging the molds by suction, a transfer arm on which said molds are mounted, means for rotating said arm about a horizontal axis perpendicular to the arm and thereby swinging the molds through an arc of substantially 180 degrees from the charging position to a delivery station, means for rotating said molds through an angle of 180 degrees about the longitudinal axis of the transfer arm during said swinging movement, a finishing mold at the delivery station, and means for transferring a parison from the blank and neck molds to the finishing mold at the delivery station.

6. In a glass forming machine, the combination of a body blank mold, a neck mold above and in register therewith, a series of finishing molds rotatable about a vertical axis, means to bring said finishing molds in succession to a delivery station, means for bringing the blank mold into contact with a pool of molten glass and gathering charges by suction, means for transferring the charges to the finishing molds in succession comprising means for moving the blank mold and neck mold from the charge gathering position about a horizontal axis to the delivery station, means for opening the blank mold at the delivery station leaving the bare blank suspended from the neck mold, means for closing a finishing mold around the blank at said delivery station, and means for blowing the blank in the finishing mold.

7. The combination of a mold carriage rotatable about a vertical axis, molds thereon, a continuously rotating horizontal drive shaft, a cam drum thereon comprising a cam track extending circumferentially and longitudinally of the drum, rolls carried by the mold carriage positioned and arranged to engage said track and cause the carriage to be rotated step-by-step, a transfer arm, means on said arm for receiving a charge of glass, means for actuating said arm in synchronism with the step movements of the mold carriage and thereby moving said charge receiving means back and forth between a charge receiving position and a delivery station, means to transfer the charges of glass to the said molds at the delivery station, said means for actuating the transfer arm comprising a rock shaft on which said arm is mounted, a pinion on said rock shaft, a rack for operating the pinion, and a cam on the drive shaft connected to reciprocate said rack.

8. A glass ware forming machine comprising a blank mold, a neck mold cooperating therewith, means to oscillate the blank and neck molds as a unit about a horizontal axis and alternately position the molds upright at charge gathering and blank transfer stations, suction means to deliver glass to the blank and neck molds at the charge gathering station, a finishing mold adapted to enclose the blanks at the transfer station, and means to effect transfer of blanks to the finishing mold.

9. In a glassware forming machine, a blank forming unit including a suction blank mold and cooperating neck mold, means to oscillate the unit about a horizontal axis between charge gathering and blank transfer stations, said neck mold being positioned above the blank mold at both stations, and a finishing mold to which blanks are transferred at said transfer station.

10. A machine for forming hollow glass articles comprising in combination a suction gathering mold, a carrier on which said mold is supported, said carrier mounted to swing downward about a horizontal axis and thereby lower the mold to a charge gathering position in contact with a supply body of molten glass, means to fill the mold by suction while in said position, means for swinging said carrier upward and thereby lifting the mold from said charge gathering position and then lowering the carrier and bringing the mold to a transfer station with the mold at the same level as when in said charge gathering position, a finishing mold, and means for transferring a parison from the gathering mold to the finishing mold.

11. A machine for forming hollow glass articles comprising in combination a suction gathering mold, a carrier on which said mold is supported, said carrier mounted to swing downward about a horizontal axis and thereby lower the mold to a charge gathering position in contact with a supply body of molten glass, means to fill the mold by suction while in said position, means for swinging said carrier upward and thereby lifting the mold from said charge gathering position and then lowering the carrier and bringing the mold to a transfer station with the mold at the same level as when in said charge gathering position, a finishing mold carriage, a finishing mold thereon, means to rotate the carriage about a vertical axis and thereby bring the finishing mold to the transfer station, and means to transfer a parison from the gathering mold to the finishing mold at said station.

12. In a machine for forming glass articles, the combination of a blank mold, a finishing mold, means for moving the blank mold from a charge gathering position in which the mold is upright with its lower end open to receive a charge of glass, to a transfer position in which the mold is upright and at the same level as at the charge gathering position, said means including a carrier on which the mold is supported, said carrier being mounted to swing about a horizontal axis for carrying the mold from the gathering position to the transfer position, a finishing mold, and means for transferring a blank from the blank mold to the finishing mold.

Signed at Toledo, in the county of Lucas and State of Ohio, this 7th day of November, 1927.

LEONARD D. SOUBIER.